US009500286B2

(12) United States Patent
Okada et al.

(10) Patent No.: US 9,500,286 B2
(45) Date of Patent: Nov. 22, 2016

(54) VALVE APPARATUS WITH BELT-SHAPED FILTER

(71) Applicant: DENSO CORPORATION, Kariya, Aichi-pref (JP)

(72) Inventors: Keita Okada, Chita-gun (JP); Daishi Ito, Yokkaichi (JP)

(73) Assignee: DENSO CORPORATION, Kariya (JP)

( * ) Notice: Subject to any disclaimer, the term of this patent is extended or adjusted under 35 U.S.C. 154(b) by 91 days.

(21) Appl. No.: 14/536,134

(22) Filed: Nov. 7, 2014

(65) Prior Publication Data

US 2015/0129059 A1 May 14, 2015

(30) Foreign Application Priority Data

Nov. 11, 2013 (JP) .................................. 2013-233145
Oct. 8, 2014 (JP) .................................. 2014-207130

(51) Int. Cl.
*B01D 24/00* (2006.01)
*F16K 11/07* (2006.01)
*F16K 27/04* (2006.01)

(52) U.S. Cl.
CPC ............. *F16K 11/07* (2013.01); *F16K 27/041* (2013.01); *F16K 27/048* (2013.01); *Y10T 137/794* (2015.04)

(58) Field of Classification Search
CPC ..... F16K 11/07; F16K 27/041; F16K 27/048
USPC ............. 137/544, 547, 550, 625.69; 210/432
See application file for complete search history.

(56) References Cited

U.S. PATENT DOCUMENTS 5,482,622 A * 1/1996 Stark ..................... B01D 29/111
156/245
7,785,098 B1 * 8/2010 Appleby ............... B29C 33/302
264/319

(Continued)

FOREIGN PATENT DOCUMENTS

JP 2007-205465 8/2007
JP 2012-247021 12/2012

OTHER PUBLICATIONS

Office Action (5 pages) dated Feb. 24, 2016, issued in corresponding Korean Application No. 10-2014-0155436 and English translation (4 pages).
Korean Intellectual Property Office, "Notice of Preliminary Rejection," (3 pages) issued in connection with Korean Patent Application No. 10-2014-0155436, dated Aug. 17, 2015, with its English language Translation (2 pages).

(Continued)

*Primary Examiner* — Craig Schneider
*Assistant Examiner* — Angelisa L Hicks
(74) *Attorney, Agent, or Firm* — Nixon & Vanderhye P.C.

(57) ABSTRACT

A valve apparatus includes a sleeve which is a hollowed tubular shape, a valve member which is disposed in the sleeve, and a filter. The sleeve includes a ring-shaped groove in an outer wall of the sleeve and a port penetrating the sleeve from a bottom surface of the ring-shaped groove. The valve member opens and closes the port. The filter is wound around the bottom surface. The filter is formed by a belt-shaped member which is wound as a ring shape such that a first end part of the belt-shaped member overlaps a second end part of the belt-shaped member. The belt-shaped member includes the first end part, the second end part, and an intermediate part. The intermediate part is disposed between the first end part and the second end part. The second end part and the intermediate part include a meshed part. The first end part includes a release portion corresponding to an opening having an opening area greater than an opening area of a sieve opening of the meshed part. The sieve opening of the meshed part of the second end part is released by the release portion of the first end part. Therefore, a deterioration of a filtration efficiency of an overlapped part between the first end part and the second end part can be restricted.

9 Claims, 7 Drawing Sheets

(56) References Cited

U.S. PATENT DOCUMENTS

| | | |
|---|---|---|
| 2005/0011703 A1 | 1/2005 | Yamaguchi |
| 2009/0255593 A1* | 10/2009 | Nordstrom .......... F16K 31/0613 137/544 |
| 2010/0243085 A1* | 9/2010 | Van Weelden ...... F15B 13/0402 137/544 |

OTHER PUBLICATIONS

Office Action (5 pages) dated Oct. 15, 2015, issued in corresponding Japanese Application No. 2014-207130 and English translation (4 pages).

* cited by examiner

VALVE APPARATUS WITH BELT-SHAPED FILTER

CROSS REFERENCE TO RELATED APPLICATION

This application is based on Japanese Patent Application No. 2013-233145 filed on Nov. 11, 2013 and Japanese Patent Application No. 2014-207130 filed on Oct. 8, 2014, the disclosure of which are incorporated herein by reference.

TECHNICAL FIELD

The present disclosure relates to a valve apparatus.

BACKGROUND

It is well known that a valve apparatus includes a sleeve which is a hollowed tubular shaped and a valve member which is disposed in the sleeve. Further, the valve member opens and closes a port of the sleeve. The valve apparatus is provided in a hydraulic circuit of an automatic transmission of a vehicle, and is applied to a hydraulic control valve supplying an operation oil to a friction engaging mechanism.

In this case, generally, a filter for filtering the operation oil is provided in the valve apparatus. The filter is formed by a belt-shaped member which is wound around a bottom surface of a ring-shaped groove of the sleeve as a ring shape such that a first end part of the belt-shaped member overlaps a second end part of the belt-shaped member. The operation oil is filtered by the filter, and then is introduced into the port opened at the bottom surface.

However, in an overlapped part between the first end part and the second end part, a sieve opening is blocked, and a filtration efficiency is magnificently deteriorated. According to JP-2005-36912A (US 2005/0011703 A1), a rotation preventing portion is provided to prevent the filter from rotating relative to the sleeve, such that a peripheral-direction position of the overlapped part does not match an opening position of the bottom of the ring-shaped groove. The rotation preventing portion includes a depression part and a protrusion part. The depression part is depressed from a side surface of the ring-shaped groove in an axial direction of the sleeve, and the protrusion part is protruded from the filter toward the depression part.

However, according to JP-2005-36912A, since the depression part is provided, a length of the outer wall of the sleeve in the axial direction becomes not even. Therefore, a seal performance between the sleeve and a valve body to which the sleeve is mounted to is deteriorated.

Further, according to JP-2005-36912A, since it is necessary to form the depression part by milling, a manufacturing cost of the sleeve is increased.

SUMMARY

The present disclosure is made in view of the above matters, and it is an object of the present disclosure to provide a valve apparatus in which a deterioration of a seal performance of an outer wall of a sleeve is restricted, an increase of a manufacturing cost is restricted, and a filtration performance of a filter can be ensured.

According to an aspect of the present disclosure, the valve apparatus includes a sleeve which is a hollowed tubular shape, a valve member which is disposed in the sleeve, and a filter. The sleeve includes a ring-shaped groove in an outer wall of the sleeve and a port penetrating the sleeve from a bottom surface of the ring-shaped groove. The valve member opens and closes the port. The filter is wound around the bottom surface.

The filter is formed by a belt-shaped member which is wound as a ring shape such that a first end part of the belt-shaped member overlaps a second end part of the belt-shaped member. The belt-shaped member includes the first end part, the second end part, and an intermediate part. The intermediate part is disposed between the first end part and the second end part. The second end part and the intermediate part include a meshed part. The first end part includes a release portion corresponding to an opening having an opening area greater than an opening area of a sieve opening of the meshed part.

The sieve opening of the meshed part of the second end part is released by the release portion of the first end part. Therefore, a deterioration of a filtration efficiency of an overlapped part between the first end part and the second end part can be restricted. Even though filter rotates relative to the spool such that a peripheral-direction position of the overlapped part matches an opening position of the bottom surface, the filtration efficiency of the overlapped part can be ensured.

Further, it is unnecessary to provide a rotation preventing portion which can prevents the filter from rotating relative to the sleeve. That is, it is unnecessary to provide a depression part depressed from a side surface of the ring-shaped groove in the axial direction and a protrusion part protruded from the filter toward the depression part. Therefore, a deterioration of a seal performance between the sleeve and the valve body due to the depression part can be restricted. Further, the sleeve can be formed only by a turning process, and an increase of a manufacturing cost can be restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, embodiments of the present disclosure will be described referring to drawings. The substantially same parts and the components are indicated with the same reference numeral and the same description will be omitted.

First Embodiment

Figure 1:
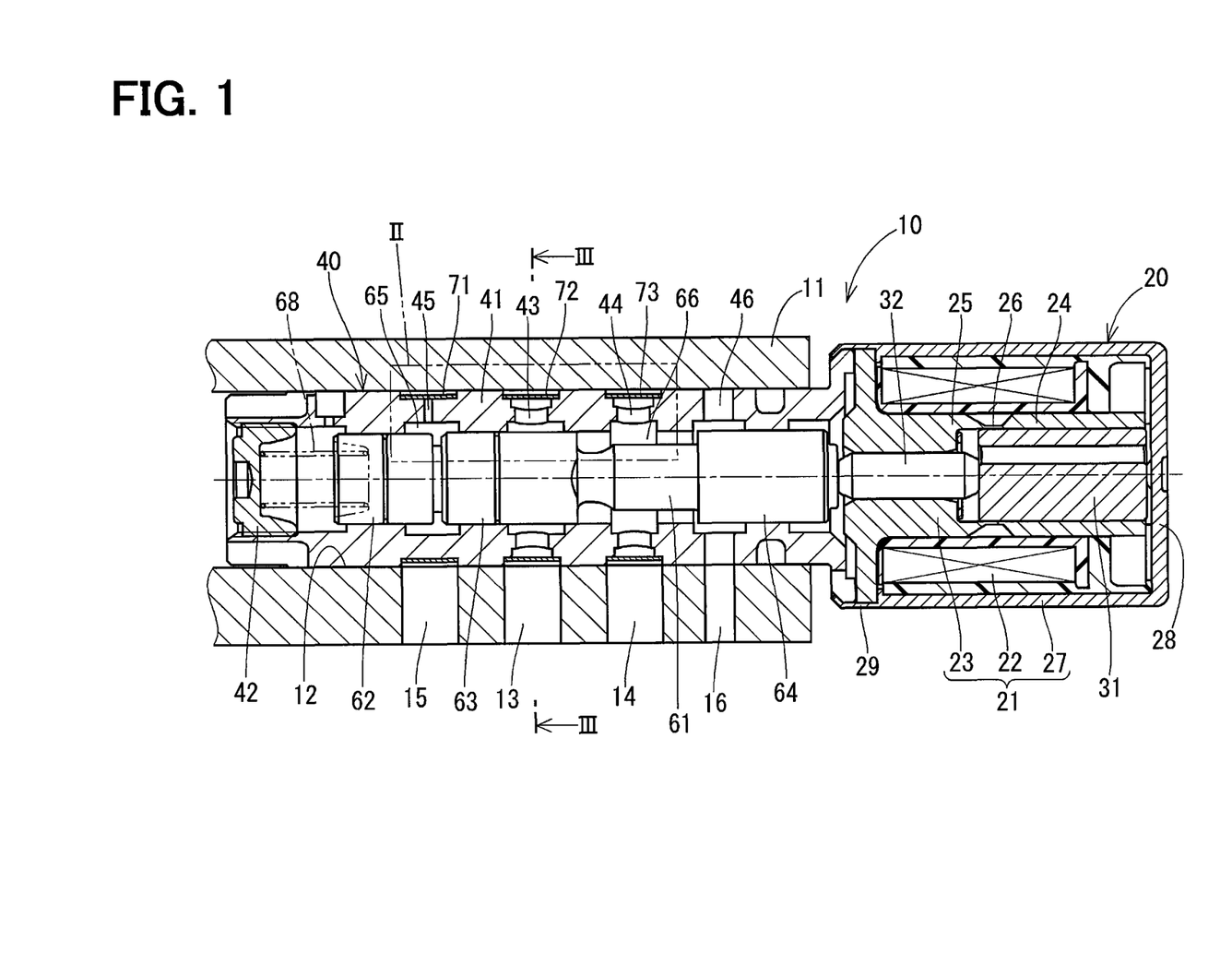
FIG. 1 is a sectional diagram showing an outline of a hydraulic control valve to which a valve apparatus is applied, according to a first embodiment of the present disclosure.

A valve apparatus according to a first embodiment of the present disclosure is applied to a hydraulic control valve 10 as shown in FIG. 1. The hydraulic control valve 10 is provided in a hydraulic circuit of an automatic transmission of a vehicle, and supplies an operation oil to a friction engaging mechanism such as a clutch or a brake.

Figure 2:
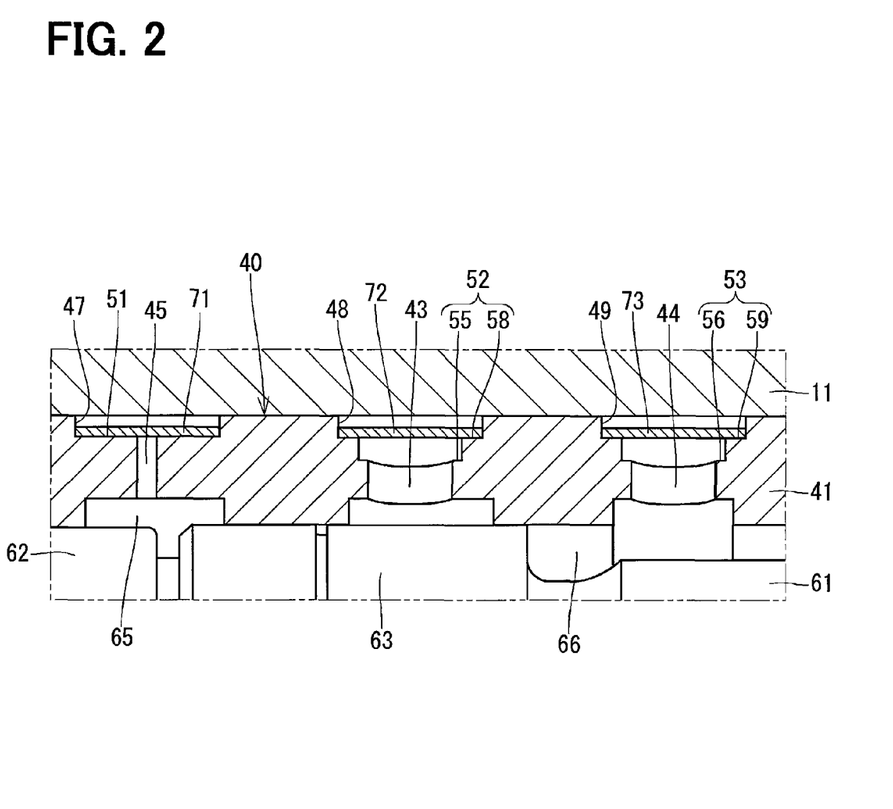
FIG. 2 is an enlarged view of an area II in FIG. 1.

Referring to FIGS. 1 and 2, a configuration of the hydraulic control valve 10 will be described.

As shown in FIG. 1, the hydraulic control valve includes an electromagnetic driving apparatus 20 and a valve apparatus 40.

The electromagnetic driving apparatus 20 corresponds to a linear solenoid including a stator 21 and a movable core 31. The stator 21 includes a coil 22 which is a ring shape, a stator core 23 which is a substantially tubular shape and is placed at a position inside of the coil 22, and a yoke 27 which is a bottomed tubular shape and is placed at a position outside of the coil 22.

The stator core 23 includes a first tubular portion 24, a second tubular portion 25, and a connection portion 26. The first tubular portion 24 is placed at a position adjacent to a bottom portion 28 of the yoke 27. The second tubular portion 25 is placed at a position adjacent to an opening portion 29 of the yoke 27. The connection portion 26 is connected to both the first tubular portion 24 and the second tubular portion 25. The movable core 31 is placed at a position inside of the first tubular portion 24, and is movable in an axial direction of the stator core 23.

When the coil 22 is energized, a magnetic field is generated around the coil 22, and a magnetic circuit is generated between the stator core 23 and the yoke 27. In the magnetic circuit, it is difficult for a magnetic flux to flow through the connection portion 26. The movable core 31 can magnetically bypass the first tubular portion 24 and the second tubular portion 25 by moving in the axial direction to span the connection portion 26. Therefore, a magnetic attractive force is applied to the movable core 31 toward the opening portion 29. The magnetic flux flowing through the magnetic circuit increases in accordance with an increase in current flowing through the coil 22. The magnetic attractive force increases in accordance with an increase in magnetic flux flowing through the magnetic circuit. A rod 32 placed at a position inside of the second tubular portion 25 is pressed by the movable core 31 in the axial direction to drive the valve apparatus 40.

The valve apparatus 40 includes a sleeve 41, a spool 61, and a spring 68.

The sleeve 41 is a hollowed tubular shape, and is mounted to a valve body 11 by being inserted into a sleeve hole 12 of the valve body 11. The valve body 11 forms the hydraulic circuit. According to the present embodiment, the sleeve 41 may be a hollowed cylindrical shape. An end portion of the sleeve 41 opposite to the electromagnetic driving apparatus 20 is blocked by a plug member 42.

The sleeve 41 includes an inlet port 43, an outlet port 44, an F/B port, and a drain port 46, which are ports penetrating in a radial direction of the sleeve 41. The inlet port 43 communicates with an inlet passage 13 included in the valve body 11, and receives the operation oil from an oil pump (not shown) via the inlet passage 13. The outlet port 44 communicates with an outlet passage 14 included in the valve body 11, and supplies the operation oil to the friction engaging mechanism (not shown) via the outlet passage 14. The F/B port 45 communicates with an F/B passage 15 branched from the outlet passage 14, and receives a part of the operation oil discharged from the outlet port 44. The drain port 46 communicates with a drain passage 16 included in the valve body 11, and can discharge the operation oil to an oil storage portion via the drain passage 16. According to the present embodiment, the oil storage portion may be an oil pan. The F/B port 45, the inlet port 43, the outlet port 44, and the drain port 46 are arranged in the axial direction in this order from the plug member 42.

A first ring-shaped groove 47, a second ring-shaped groove 48, and a third ring-shaped groove 49 are formed in an outer wall of the sleeve 41. As shown in FIG. 2, a second bottom surface 52 of the second ring-shaped groove 48 and a third bottom surface 53 of the third ring-shaped groove 49 have stepped parts. Specifically, the second bottom surface 52 of the second ring-shaped groove 48 has a center part 55 and an end part 58, and the third bottom surface 53 of the third ring-shaped groove 49 has a center part 56 and an end part 59. The center part 55 is further depressed in the radial direction than the end part 58. The center part 56 is further depressed in the radial direction than the end part 59.

The F/B port 45 is opened at a first bottom surface 51 of the first ring-shaped groove 47. The inlet port 43 is opened at the center part 55 of the second bottom surface 52 of the second ring-shaped groove 48. The outlet port 44 is opened at the center part 56 of the third bottom surface 53 of the third ring-shaped groove 49.

As shown in FIG. 1, the spool 61 is movable in an axial direction of the sleeve 41 in the sleeve 41. According to the present embodiment, the axial direction of the sleeve 41 matches the axial direction of the stator core 23. The spool 61 includes a first land 62, a second land 63, and a third land 64, which are arranged in this order from the plug member 42.

An F/B chamber 65 of the sleeve 41 which is formed between the first land 62 and the second land 63 receives the operation oil from the F/B port 45. The operation oil in the F/B chamber 65 applies an F/B oil-pressure to the spool 61. The F/B oil-pressure is established according to a pressure of the operation oil discharged by the outlet port 44.

A communication chamber 66 of the sleeve 41 which is formed between the second land 63 and the third land 64 can communicate with the inlet port 43 and the outlet port 44 according to a position of the spool 61 in the axial direction, and can communicate with the outlet port 44 and the drain port 46 according to the position of the spool 61 in the axial direction. According to the present embodiment, the position of the spool 61 in the axial direction is referred to an axial-direction position of the spool 61. When the communication chamber 66 communicates with the inlet port 43 and the outlet port 44, the drain port 46 is blocked by the third land 64. When the communication chamber 66 communicates with the outlet port 44 and the drain port 46, the inlet port 43 is blocked by the second land 63.

The spool 61 can open or close each port of the sleeve 41 according to the axial-direction position of the spool 61. The spool 61 corresponds to a valve element.

The spring 68 is provided in the sleeve 41 between the plug member 42 and the spool 61, and biases the spool 61 toward the electromagnetic driving apparatus 20.

The axial-direction position of the spool 61 is set by a balance between a biasing force of the spring 68 and a pressing force of the electromagnetic driving apparatus 20. When the pressing force of the electromagnetic driving apparatus 20 is not generated, the spool 61 communicates with the outlet port 44 and the drain port 46. When the pressing force of the electromagnetic driving apparatus 20 is greater than the biasing force of the spring 68, the spool 61 moves toward the plug member 42 and communicates with the inlet port 43 and the outlet port 44.

Next, a configuration of the valve apparatus 40 will be described referring to FIGS. 1 to 6.

Figure 3:
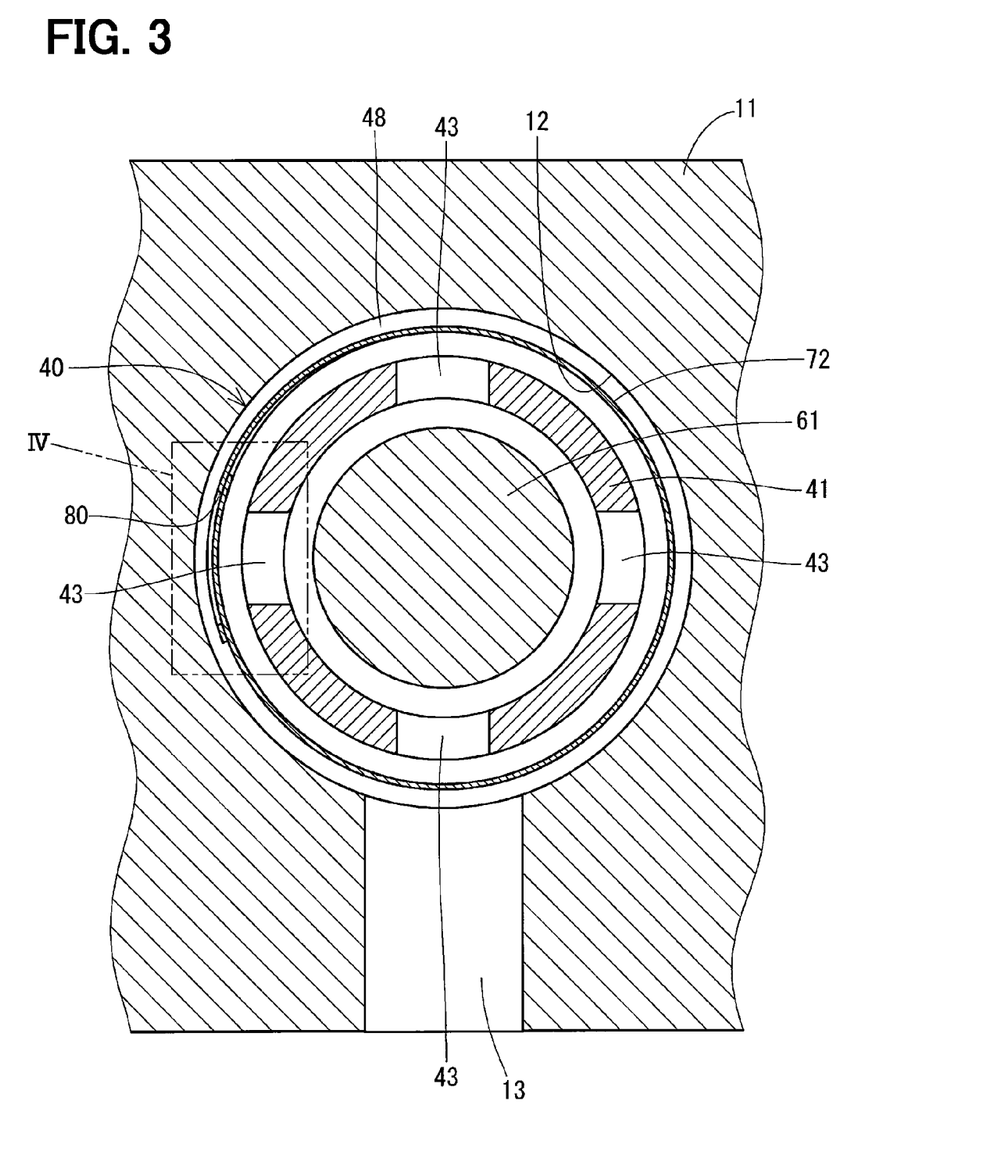
FIG. 3 is a sectional view of FIG. 1 along a line III-III.

As shown in FIG. 3, four inlet ports 43 are provided in a peripheral direction of the valve body 11 with the same intervals. In the same way, four outlet ports 44, four F/B ports 45 are provided. As shown in FIGS. 2 and 3, a first filter 71, a second filter 72, and a third filter 73 are wound around the first bottom surface 51, the second bottom surface 52, and the third bottom surface 53, respectively. Specifically, the second filter 72 and the third filter 73 are wound around the end part 58 of the second bottom surface 52 and the end part 59 of the third bottom surface 53, respectively.

The first filter 71, the second filter 72, and the third filter 73 have the same configuration. Next, the configuration of the second filter 72 will be described as a representative.

Figure 4:
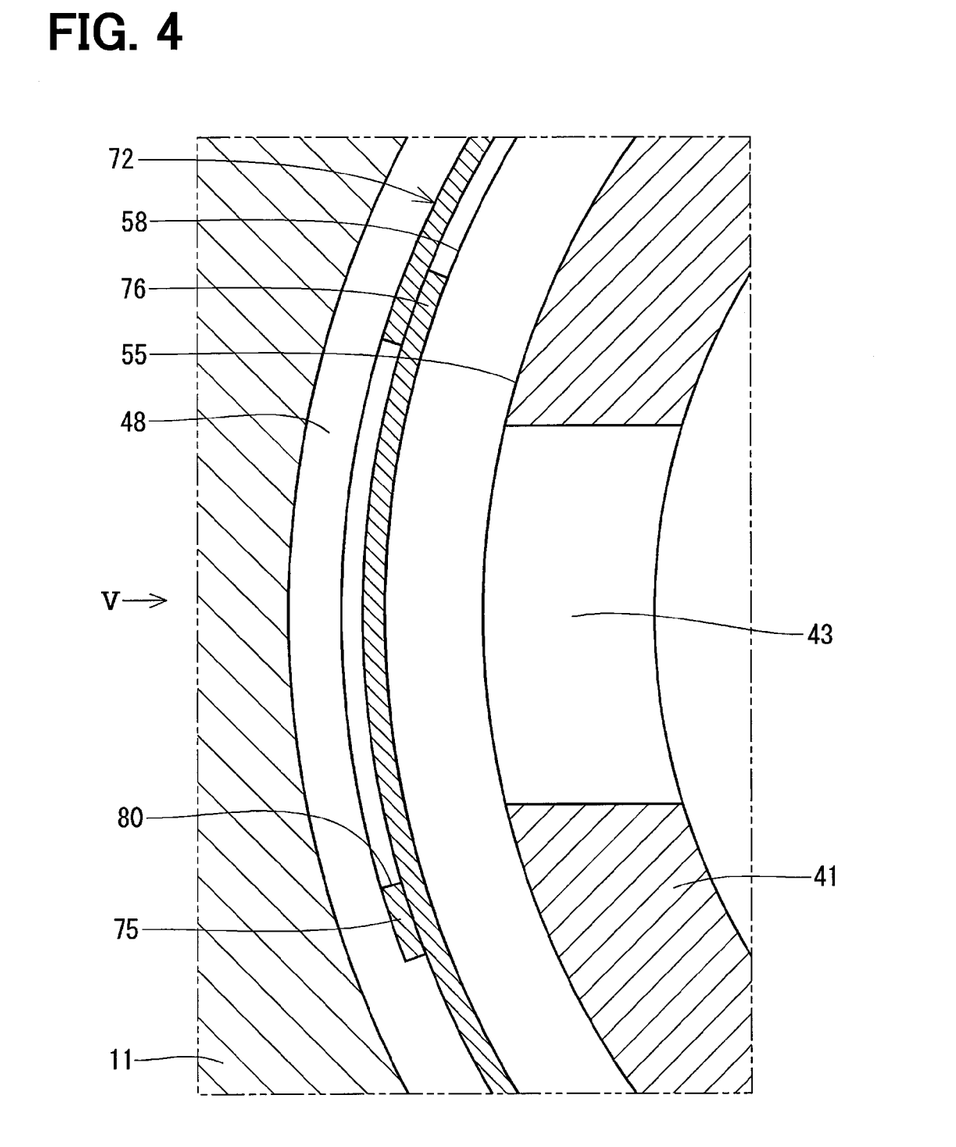
FIG. 4 is an enlarged view of an area IV in FIG. 3.
Figure 5:
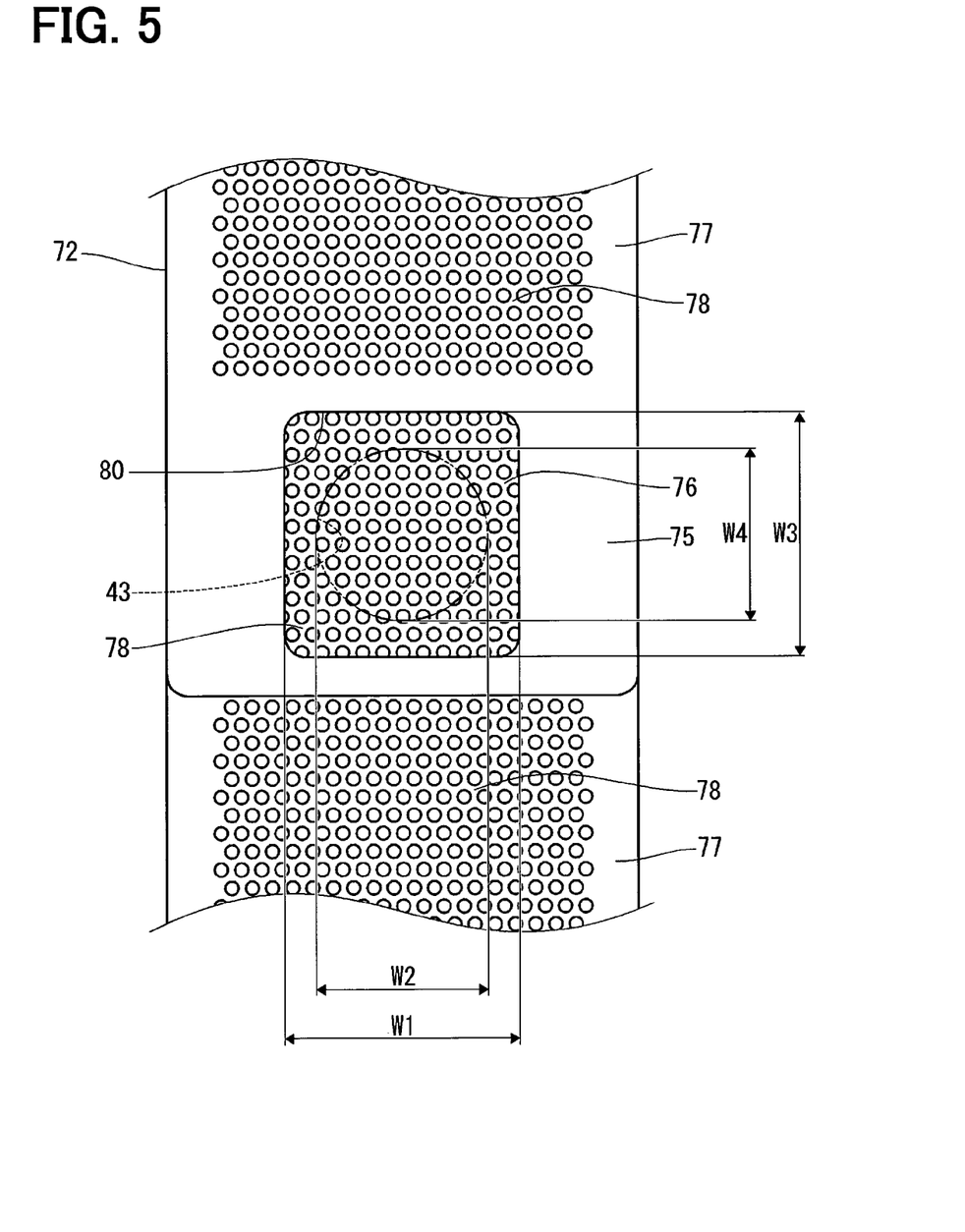
FIG. 5 is a diagram showing a view of a filter in FIG. 4 along an arrow V.

The second filter 72 shown in FIGS. 3 to 5 is formed by a belt-shaped member 74 which is wound as a ring shape such that a first end part 75 of the belt-shaped member 74 overlaps a second end part 76 of the belt-shaped member 74. As shown in FIGS. 3 to 5, the first end part 75 is placed at a position radially outward of the second end part 76 in the radial direction. Further, the first end part 75 is fixed to the second end part 76 by a laser welding at two side parts of the first end part 75 and the second end part 76.

Figure 6:
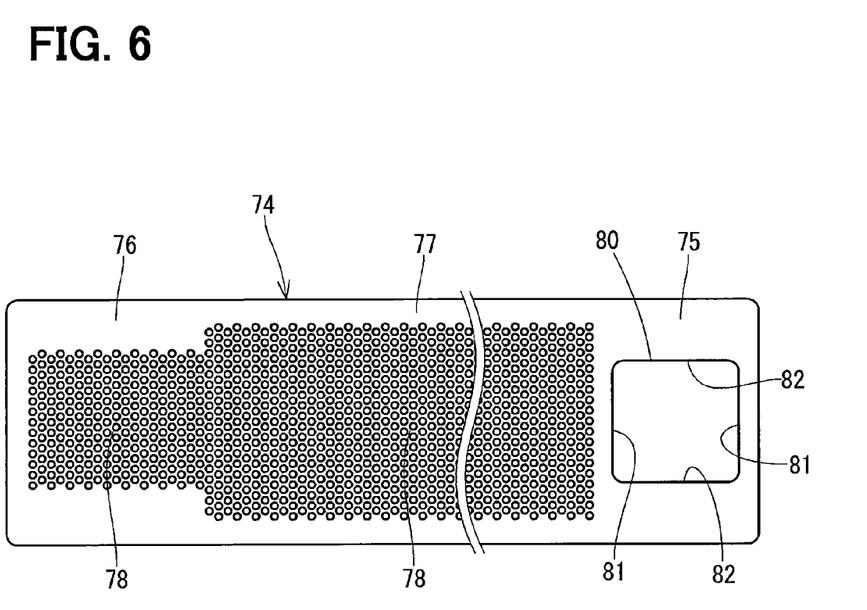
FIG. 6 is a plan view showing a belt-shaped member corresponding to a base part of the filter in FIG. 3.

As shown in FIG. 6, the belt-shaped member 74 which is made of metal includes the first end part 75, the second end part 76, and an intermediate part 77. The second end part 76 and the intermediate part 77 have a meshed part 78. The meshed part 78 has a sieve opening through which the operation oil flows. Further, foreign matters included in the operation oil are collected by the meshed part 78.

The first end part 75 forms a through opening 80 which has an opening area greater than an opening area of the sieve opening of the meshed part 78. The through opening 80 corresponds to a release portion. According to the present embodiment, the through opening 80 is a rectangular shape, and has a pair of first edges 81 and a pair of second edges 82. The pair of first edges 81 is parallel to a width direction of the belt-shaped member 74. Each of the pair of second edges 82 is arranged to connect with both of the pair of first edges 81. The through opening 80 and the sieve opening of the meshed part 78 are formed by etching at the same time.

As shown in FIG. 2, the second filter 72 is engaged with the second ring-shaped groove 48. A width of the second filter 72 is set to be substantially equal to a width of the second ring-shaped groove 48.

As shown in FIG. 5, the through opening 80 is formed at a center position of the second filter 72 in a width direction of the second filter 72. The opening of the inlet port 43 is a circular shape, and is formed at a center position of the second bottom surface 52 in the width direction. A first opening dimension W1 of the through opening 80 is greater than a second opening dimension W2 of the inlet port 43 in the width direction. A third opening dimension W3 of the through opening 80 is greater than a fourth opening dimension W4 of the inlet port 43 in the peripheral direction. Thus, the opening area of the through opening 80 is greater than an opening area of the inlet port 43.

According to the first embodiment, the second filter 72 is formed by the belt-shaped member 74 which is wound as a ring shape such that the first end part 75 of the belt-shaped member 74 overlaps the second end part 76 of the belt-shaped member 74. The second filter 72 has the meshed part 78 except the first end part 75. The first end part 75 includes the through opening 80 that is greater than the sieve opening of the meshed part 78.

According to the above configuration, the sieve opening of the meshed part 78 is released by the through opening 80. Therefore, a deterioration of a filtration efficiency of an overlapped part between the first end part 75 and the second end part 76 can be restricted. According to the first embodiment, even though the second filter 72 rotates relative to the spool 61 such that a peripheral-direction position of the overlapped part matches an opening of the second bottom surface 52 the filtration efficiency of the overlapped part can be ensured.

According to the first embodiment, it is unnecessary to provide a rotation preventing portion which can prevents the second filter 72 from rotating relative to the sleeve 41. In other words, it is unnecessary to provide a depression part depressed from a side surface of the second ring-shaped groove 48 in the axial direction and a protrusion part protruded from the second filter 72 toward the depression part. According to the first embodiment, a deterioration of a seal performance between the sleeve 41 and the valve body 11 due to the depression part can be restricted. Further, the sleeve 41 can be formed only by a turning process, and an increase of a manufacturing cost can be restricted.

According to the first embodiment, the opening area of the through opening 80 is greater than the opening area of the inlet port 43 opened at the second bottom surface 52.

Therefore, the deterioration of the filtration efficiency of the overlapped part between the first end part 75 and the second end part 76 can be restricted.

According to the first embodiment, the through opening 80 is a rectangular shape, and has the pair of first edges 81 and the pair of second edges 82. The pair of first edges 81 is parallel to a width direction of the belt-shaped member 74. Each of the pair of second edges 82 is arranged to connect with both of the pair of first edges 81.

Therefore, a flowing area of the through opening 80 can be possibly increased, and the deterioration of the filtration efficiency of the overlapped part between the first end part 75 and the second end part 76 can be further restricted.

According to the first embodiment, the through opening 80 and the sieve opening of the meshed part 78 are formed by etching at the same time.

Therefore, the through opening 80 can be formed in the first end part 75 without increasing any manufacturing processes.

According to the first embodiment, the through opening 80 and the sieve opening of the meshed part 78 are formed by etching.

Therefore, the through opening 80 and the sieve opening of the meshed part 78 can be relatively readily formed at the same time.

In a case where the first end part 75 is placed at a position radially inward of the second end part 76 in the radial direction, when the second filter 72 is wound around the sleeve 41, the second end part 76 may be moved radially outward of the first end part 75 due to a spring back. In this case, a gap is generated between the first end part 75 and the second end part 76, and communicates with the through opening 80. Thus, it is possible that foreign matters enter the sleeve 41 via the gap and the through opening 80.

In contrast, according to the first embodiment, the first end part 75 is placed at a position radially outward of the second end part 76 in the radial direction.

Therefore, even though a gap is generated between the first end part 75 and the second end part 76 in a case where the first end part 75 is moved radially outward of the second end part 76, the gap communicates with the sleeve 41 via the meshed part 78 of the second end part 76. Thus, foreign matters can be prevented from entering the sleeve 41.

According to the first embodiment, the valve apparatus 40 includes the spool 61 as the valve member, and the spool 61 is movable in the sleeve 41 in the axial direction.

Therefore, a filtration performance of the second filter 72 can be ensured, and a hydraulic control of the valve apparatus 40 can be accurately executed.

Second Embodiment

The valve apparatus according to a second embodiment of the present disclosure will be described referring to FIG. 7.

Figure 7:
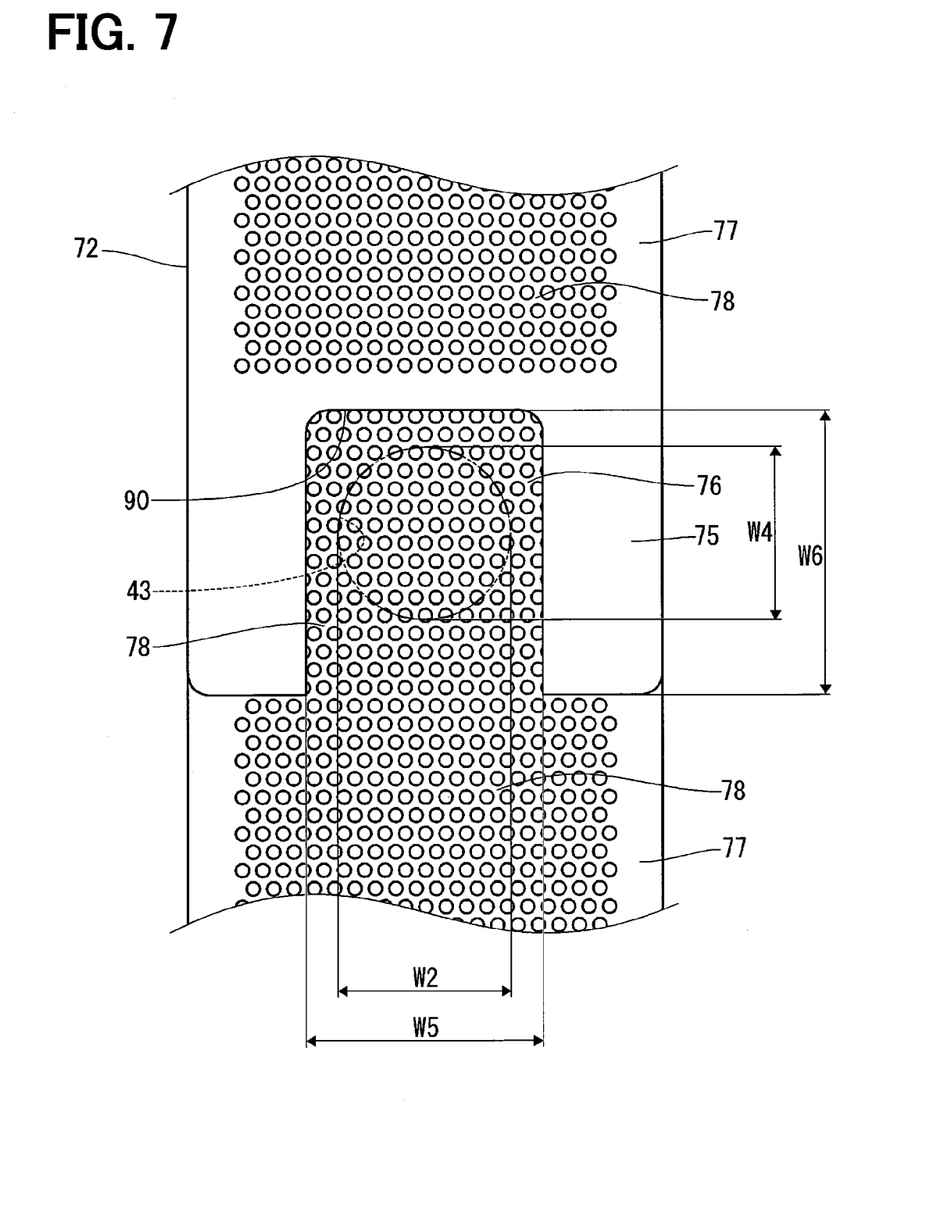
FIG. 7 is a diagram showing a view of the filter included in the valve apparatus, according to a second embodiment of the present disclosure.

As shown in FIG. 7, the first end part 75 includes a notch 90 having an opening area greater than the opening area of the sieve opening of the meshed part 78. The notch 90 corresponds to a release portion. The notch 90 extends from an end of the first end part 75 in the peripheral direction, and has a rectangular shape. The notch 90 and the sieve opening of the meshed part 78 are formed by etching at the same time.

The notch 90 is formed at a center position of the second filter 72 in the width direction. A fifth opening dimension W5 of the notch 90 is greater than the second opening dimension W2 of the inlet port 43 in the width direction. A sixth opening dimension W6 of the notch 90 is greater than the fourth opening dimension W4 of the inlet port 43 in the peripheral direction. Thus, the opening area of the notch 90 is greater than the opening area of the inlet port 43. In addition, the fifth opening dimension W5 of the notch 90 is equal to the first opening dimension W1 of the through opening 80.

According to the second embodiment, since the notch 90 corresponding to the release portion is provided in the first end part 75, effects as the same as the first embodiment can be obtained.

Other Embodiment

According to other embodiments of the present disclosure, the release portion is not limited to the rectangular shape. For example, the release portion may have other shapes such as a circular shape, an elliptical shape, or a polygon shape.

According to other embodiments of the present disclosure, the opening dimension of the release portion may be less than the opening dimension of each of ports opened at bottom surfaces of ring-shaped grooves, in the width direction.

According to other embodiments of the present disclosure, the opening dimension of the release portion may be less than the opening dimension of each of ports opened at bottom surfaces of ring-shaped grooves, in the peripheral direction.

According to other embodiments of the present disclosure, the release portion may be formed at a position other than the center position in the width direction.

According to other embodiments of the present disclosure, the release portion and the sieve opening of the meshed part may be formed at different time. The release portion is not limited to be formed by etching. For example, the release portion may be formed by pressing.

According to other embodiments of the present disclosure, the first end part may have plural release portions. In this case, the opening dimension of each of release portions may be less than the opening dimension of ports opened at bottom surfaces of ring-shaped grooves.

According to other embodiments of the present disclosure, the filters are not limited to be made of metal. For example, the filters may be made of resin.

According to other embodiments of the present disclosure, the first end part and the second end part are not limited to be fit to each other by a laser welding. For example, the first end part and the second end part may be fit to each other by other welding such as a resistance welding, a glue, a river caulking, or a clamp. When the filters are made of resin, the first end part and the second end part may be fit to each other by welding or by an engagement between a protrusion and a depression.

According to other embodiments of the present disclosure, the ports opened at the surfaces of the ring-shaped grooves are not limited to have circular shapes. For example, each of the ports may have other shapes such as a rectangular shape, an elliptical shape, or a polygon shape.

According to other embodiments of the present disclosure, each of the ports may be formed at a position other than the center position in the width direction.

According to other embodiments of the present disclosure, the valve member of the valve apparatus is not limited to the spool and may be other valve members. In other words, a valve member, which is provided in the sleeve and can open and close a port included in the sleeve, may be used.

According to other embodiments of the present disclosure, the valve apparatus is not limited to be applied to the hydraulic circuit of the automatic transmission of the vehicle, and may be applied to other devices or systems.

The present disclosure is not limited to the embodiments mentioned above, and can be applied to various embodiments within the spirit and scope of the present disclosure.

What is claimed is:
1. A valve apparatus comprising:
 a sleeve that is a hollowed tubular shape, the sleeve including a ring-shaped groove in an outer wall of the sleeve and a port penetrating the sleeve from a bottom surface of the ring-shaped groove;
 a valve member disposed in the sleeve, the valve member opening and closing the port; and
 a filter wound around the bottom surface, wherein
 the filter is formed by a belt-shaped member which is wound as a ring shape such that a first end part overlaps a second end part,
 the belt-shaped member includes the first end part, the second end part, and an intermediate part,
 the intermediate part is disposed between the first end part and the second end part,
 the second end part and the intermediate part include a meshed part, and
 the first end part includes a release portion corresponding to an opening having an opening area greater than an opening area of a sieve opening of the meshed part and the opneing overlaps the meshed part of the second part.

2. The valve apparatus according to claim 1, wherein the opening area of the release portion is greater than an opening area of the port opened at the bottom surface.

3. The valve apparatus according to claim 1, wherein the release portion is a rectangular shape, and has a pair of first edges and a pair of second edges,
the pair of first edges is parallel to a width direction of the belt-shaped member, and
each of the pair of second edges is arranged to connect with both of the pair of first edges.

4. The valve apparatus according to claim 1, wherein the release portion and the sieve opening of the meshed part are formed at the same time.

5. The valve apparatus according to claim 4, wherein the release portion and the sieve opening of the meshed part are formed by etching.

6. The valve apparatus according to claim 1, wherein the first end part is placed at a position radially outward of the second end part in a radial direction of the sleeve.

7. The valve apparatus according to claim 1, wherein the valve member is a spool that is movable in an axial direction of the sleeve in the sleeve.

8. The valve apparatus according to claim 1, wherein the first end part is welded to the second end part.

9. The valve apparatus according to claim 1, wherein the opening overlaps the meshed part of the second part to allow fluid to pass through the opening and into or out of the port.

* * * * *